United States Patent Office 2,856,286
Patented Oct. 14, 1958

2,856,286

PRODUCT FOR AUGMENTING THE BIOLOGICAL VALUE OF NUTRITIVE PRODUCTS, NUTRITIVE PRODUCTS FOR ANIMAL AND VEGETABLE LIVING BEINGS OBTAINED BY THE ACTION OF SAID AUGMENTING PRODUCT, AND METHOD FOR PREPARING SAID PRODUCTS

Georges Edouard Albert Delarche, Mouy, France, assignor to Applications Biologiques, Mouy, France No Drawing. Application November 5, 1952
Serial No. 318,963

Claims priority, application France November 8, 1951

14 Claims. (Cl. 99—9)

The present invention relates to a biological value augmenter for nutritive products for animal or vegetable living beings appearing in the form of a powder which is biologically living while perfectly capable of being preserved, to improved nutritive products, more particularly food products for cattle and manure for cultivated land, which are obtained by the action of said biological value augmenter on conventional nutritive products for animal and vegetable living beings, and to the method for preparing said biological value augmenter and said improved nutritive products.

For preparing the biological value augmenter, a mixture containing, on the one hand, the viscous or gelatinous substance obtained by the inoculation of natural water, containing a small amount of mineral salts and having a pH comprised between 7 and 8, with vegetable organisms pertaining to the group of algae and lichen, and by the growing of said vegetable organisms in said water, and, on the other hand, a culture medium the base of which is a sugar and vegetable substance which contain carbohydrates, such as corn grindings or offals, is submitted to fermentation under the action of yeast plants, said fermentation being stopped in a known way when the formation of malic acid appears, the growing of the vegetable organisms and the fermentation taking place under reduced lighting free from ultra-violet rays and at a temperature lower than 40° C.

If aliments for animals are to be produced, a biochemical reaction is brought about in the darkness, or at least under protection against ultra-violet rays, and at a temperature lower than 40° C., between the biological value augmenter thus obtained and living vegetable matter containing chlorophyll the reaction being stopped when the formation of malic acid appears. The biological value augmenter acts on the chlorophyllous living vegetable matter, i. e. on vegetable matter the vegetative cycle of which is not yet ended, as a leaven for inducing a pseudo-fermentation under conditions similar to those of panification. This reaction yields a friable substance easily reduced to powder, owing to the dehydration resulting from the autogenic or spontaneous heating obtained during said reaction.

If however a soil fertilizing product or manure is wanted, an acid is added to the fermentation product biological value augmenter so that the pH of the mixture be comprised between 5 and 7, the acidified product is then dehydrated and mixed in thorough or at least partial darkness with a pulverized dried vegetable and pulverulent anhydrous calcium chloride capable of promoting an alkaline or basic reaction, while avoiding an excess of alkalinity, these various operations being performed under reduced lighting and at a temperature lower than 40° C. The fertilizing action of the final product is due jointly to the growing of the vegetable organisms in natural water containing a small amount of mineral salts for forming a viscous substance, to the growing of the yeast plants on said viscous substance enriched by the culture medium and the vegetable substance which contain carbohydrates and to the mineral equilibrium obtained by the introduction of basic elements.

The food and fertilizing products thus produced may be used by themselves, but it is convenient in the practice to use them mixed with known nutritive or fertilizing other products, such as flours, oils, mineral salts, etc., so as to compose compensated formulae.

The following examples are given solely to explain more clearly how the invention may be carried out in practice.

*Example I*

15 litres of non distilled natural water, i. e. water containing a small amount of mineral salts, are inoculated with 4 to 150 gr. of vegetable organisms such as natural algae or pulverized agar-agar, lichen, alga or carragheen, at a temperature of 25° C. The vegetable organisms grow during six hours and thus produce a viscous substance, from which the solid residues are removed, if there are such. Such a growing is endothermic.

Meanwhile, 5 litres of a culture medium containing as base a sugar are inoculated with yeast plants, the growing of which in said medium is also endothermic. The thus inoculated culture medium is added to said viscous substance, whereupon the whole is mixed with 6 kg. of non sprouted barley grinding and 8 kg. of straw dust or mill offals. A rapid fermentation exothermic reaction, takes place and produces a substance the consistency of which is that of bread dough when the fermentation is stopped as soon as malic acid appears. Said bread dough like substance forms the biological value augmenter according to the invention.

Said biological value augmenter is then spread in half-darkness on tables covered with a thick layer of lucern flour in the proportion of 34 kg. dough for 30 kg. lucern flour. A sort of fermentation takes place with autogenic evolution of heat, evaporation of water and degradation of the lucern cellulose. The reaction is completed when the sweet meat odour that characterises the formation of malic acid is discerned.

All the above reactions are performed at a temperature lower than 40° C. and under reduced lighting.

About 60 kg. of a friable substance are obtained, which substance may be easily crumbled into a powder constituting an excellent biological aliment for animals. Said powder may be used alone or associated with such known elements as are usual in composite aliments of cattle or poultry.

*Example II*

The biological value augmenter as obtained in the second step of Example I is acidified with hydrochloric or sulfuric acid down to a pH comprised between 5 and 7 and is then dehydrated at a very moderate temperature under 40° C.

The product thus obtained and reduced to powder is then mixed with mosses, algae or other elementary sea- or land-vegetables previously dried and pulverized, and with anhydrous calcium chloride.

The fertilizing product thus obtained considerably promotes the growth of plants such as cereals, kitchen-vegetables, etc., and may, if wanted, be mixed with known other substances required by the soil.

What I claim is:

1. A method for preparing a biological value augmenter for nutritive products for animal and vegetable living beings, which consists in, successively and under reduced lighting free from ultra-violet rays at a temperature lower than 40° C., inoculating natural water containing a small amount of mineral salts and having a pH comprised between 7 and 8 with vegetable organisms from the group consisting of algae and lichen, maintaining the growing of said vegetable organisms in said water until the maximum viscosity is attained, adding the thus obtained viscous substance to a substance containing a culture medium the base of which is a sugar and vegetable substance which contain carbohydrates, submitting the thus obtained mixture to fermentation under the action of yeast plants, inoculated in said culture medium, and stopping the fermentation when the formation of malic acid appears.

2. A method according to claim 1, wherein the algae and lichen are previously pulverized.

3. A method according to claim 1, wherein the vegetable substances which contain carbohydrates are constituted by corn grindings.

4. A method according to claim 1, wherein the vegetable substances which contain carbohydrates are constituted by straw dust.

5. A method according to claim 1, wherein the vegetable substances which contain carbohydrates are constituted by mill offals.

6. A method for preparing a biological value augmenter for nutritive products for animal and vegetable living beings which consists in, successively and under reduced lighting free from ultra-violet rays at a temperature lower than 40° C., inoculating natural water containing a small amount of mineral salts and having a pH comprised between 7 and 8 with vegetable organisms from the group consisting of algae and lichen, maintaining the growing of said vegetable organisms in said water until the maximum viscosity is attained, preparing a culture medium the base of which is a sugar, inoculating said culture medium with yeast plants, adding the viscous substance obtained by the growing of the vegetable organisms to said inoculated culture medium, adding to the mixture obtained in the preceding step vegetable substances which contain carbohydrates, and stopping the resulting fermentation when the formation of malic acid appears, the substance then obtained having the consistency of bread dough.

7. A method for preparing a food product for animals which consists in, successively and under reduced lighting free from ultra-violet rays at a temperature lower than 40° C. inoculating natural water containing a small amount of mineral salts and having a pH comprised between 7 and 8 with vegetable organisms from the group consisting of algae and lichen, maintaining the growing of said vegetable organisms in said water until the maximum viscosity is attained, preparing a culture medium the base of which is a sugar, inoculating said culture medium with yeast plants, adding the viscous substance obtained by the growing of the vegetable organisms to said inoculated culture medium, adding to the mixture obtained in the preceding step vegetable substances which contain carbohydrates, and stopping the resulting fermentation when the formation of malic acid appears, the substance thus obtained acting as biological value augmenter and having the consistency of bread dough, adding said biological value augmenter to living vegetable matter containing chlorophyll, allowing the biochemical reaction which takes place between said living vegetable matter and said biological value augmenter under the form of a pseudofermentation, stopping said biochemical reaction when the formation of malic acid appears, and pulverizing the friable substance resulting from said biochemical reaction.

8. A method for preparing manure for cultivated lands which consists in inoculating natural water containing a small amount of mineral salts and having a pH comprised between 7 and 8 with vegetable organisms from the group consisting of algae and lichen, maintaining the growing of said vegetable organisms in said water until the maximum viscosity is attained, preparing a culture medium the base of which is a sugar, inoculating said culture medium with yeast plants, adding the viscous substance obtained by the growing of the vegetable organisms to said inoculated culture medium, adding to the mixture obtained in the preceding step vegetable substances containing carbohydrates, stopping the resulting fermentation when the formation of malic acid appears, all the preceding steps being performed under reduced lighting free from ultra-violet rays at a temperature lower than 40° C., the substance thus obtained acting as biological value augmenter and having the consistency of bread dough, acidifying the biological value augmenter thus obtained without excess of acidity so that the pH be comprised between 5 and 7, dehydrating said acidified substance at a temperature lower than 40° C., and adding to the dehydrated acidified substance a mixture containing pulverized dried vegetables and anhydrous calcium chloride.

9. A biological value augmenter for nutritive products for animal and vegetable living beings obtained by the process claimed in claim 1.

10. A biological value augmenter for nutritive products for animal and vegetable living beings having the consistency of bread dough and obtained by the process as claimed in claim 6.

11. A food product for animals and prepared as claimed in claim 7.

12. A manure for soil and prepared as claimed in claim 8.

13. A method according to claim 7, further comprising the addition of the friable substance obtained by the biochemical reaction to conventional food products for animals.

14. A method according to claim 8, further comprising the addition of the manure with at least one substance required by the soil.

References Cited in the file of this patent

UNITED STATES PATENTS

| | | |
|---|---|---|
| 1,898,350 | Dyer | Feb. 21, 1933 |
| 2,168,722 | Townsend | Aug. 8, 1939 |

FOREIGN PATENTS

| | | |
|---|---|---|
| 17,732 | Great Britain | 1893 |
| 36,245 | Denmark | July 3, 1926 |